No. 654,024. Patented July 17, 1900.
P. RYAN.
MACHINE FOR MAKING FIREPROOF COVERINGS FOR WALLS OR CEILINGS.
(Application filed Jan. 29, 1900.)
(No Model.) 5 Sheets—Sheet 1.
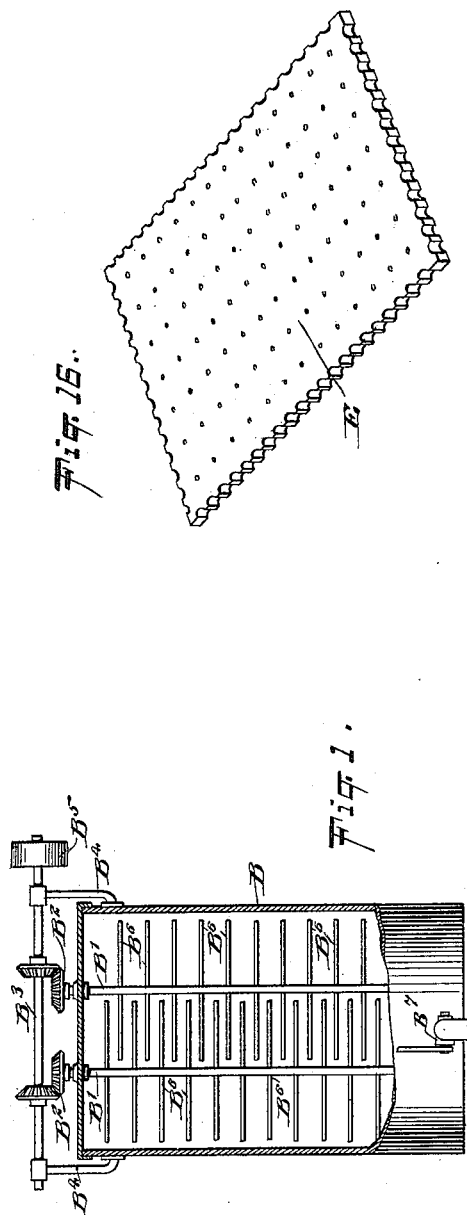
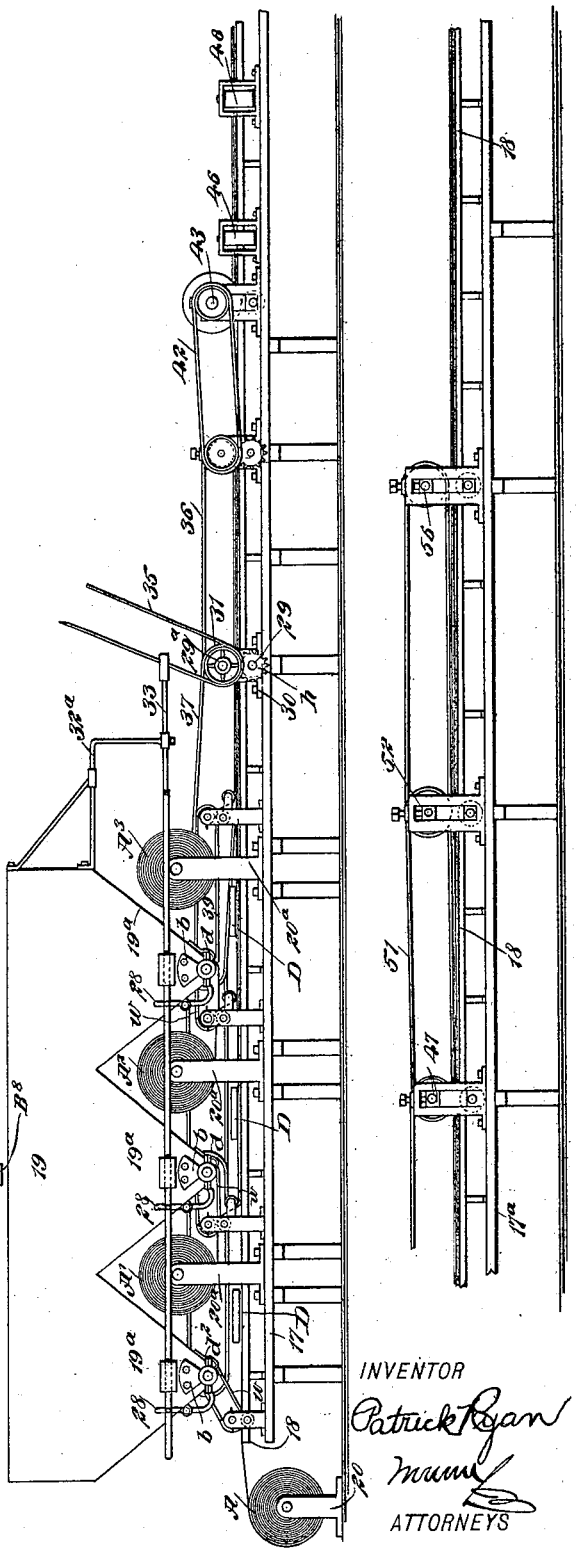
WITNESSES:
William P. Goebel.
Wm P. Patton
INVENTOR
Patrick Ryan
ATTORNEYS No. 654,024. Patented July 17, 1900.
P. RYAN.
MACHINE FOR MAKING FIREPROOF COVERINGS FOR WALLS OR CEILINGS.
(Application filed Jan. 29, 1900.)
(No Model.) 5 Sheets—Sheet 2.
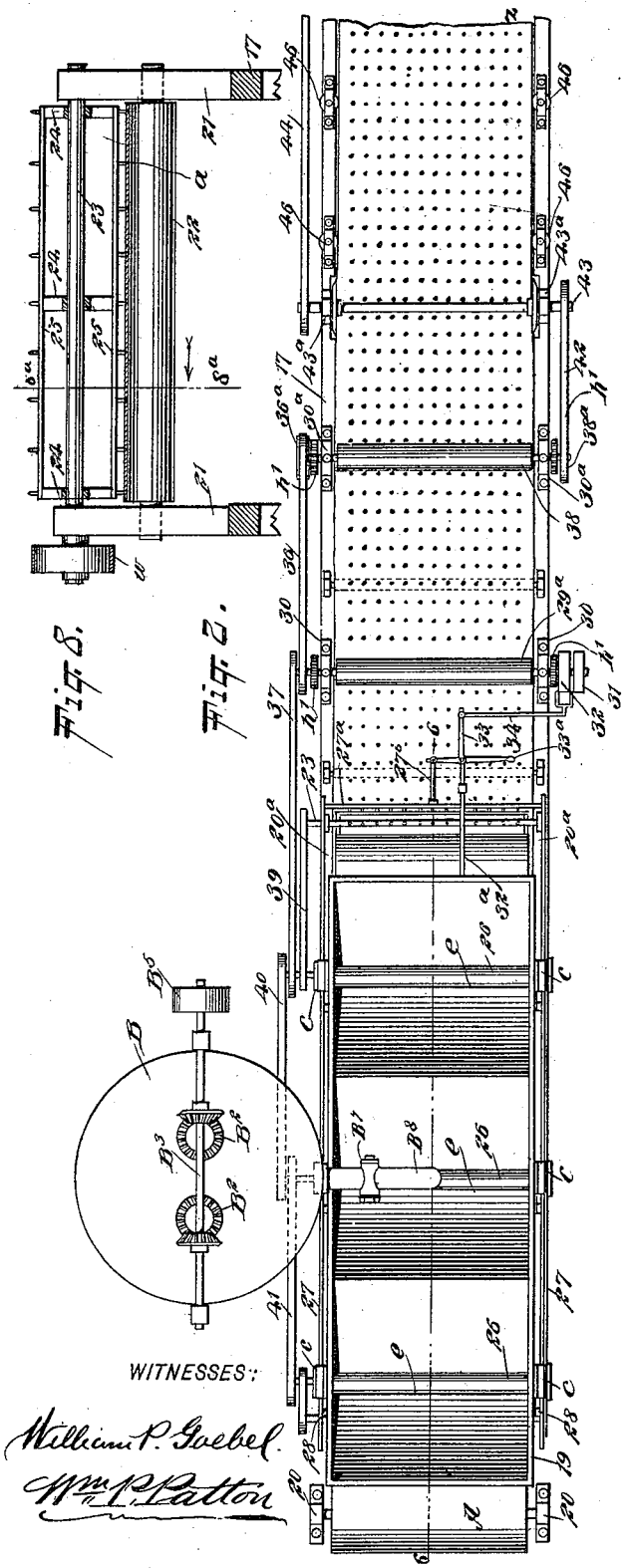
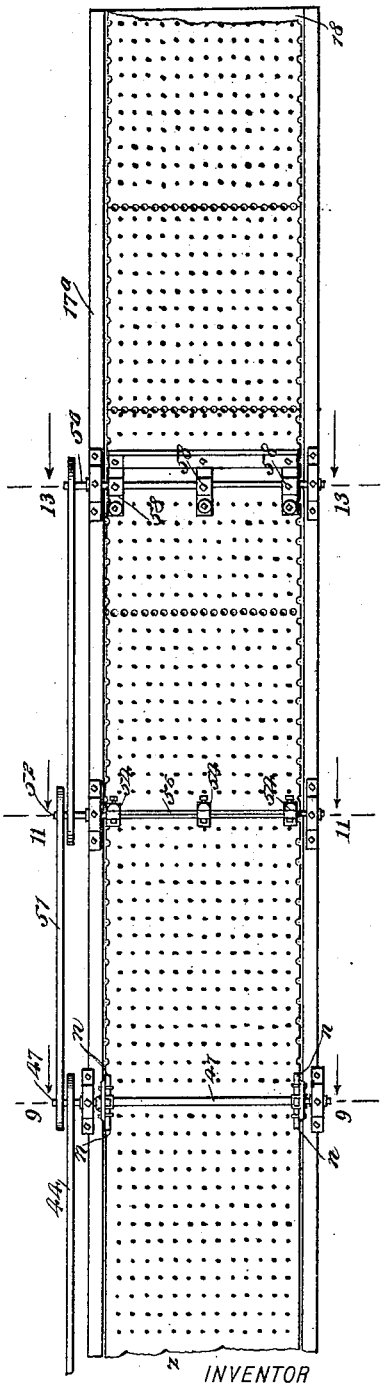
WITNESSES:
INVENTOR
Patrick Ryan
BY
ATTORNEYS No. 654,024. Patented July 17, 1900.
P. RYAN.
MACHINE FOR MAKING FIREPROOF COVERINGS FOR WALLS OR CEILINGS.
(Application filed Jan. 29, 1900.)
(No Model.) 5 Sheets—Sheet 3.
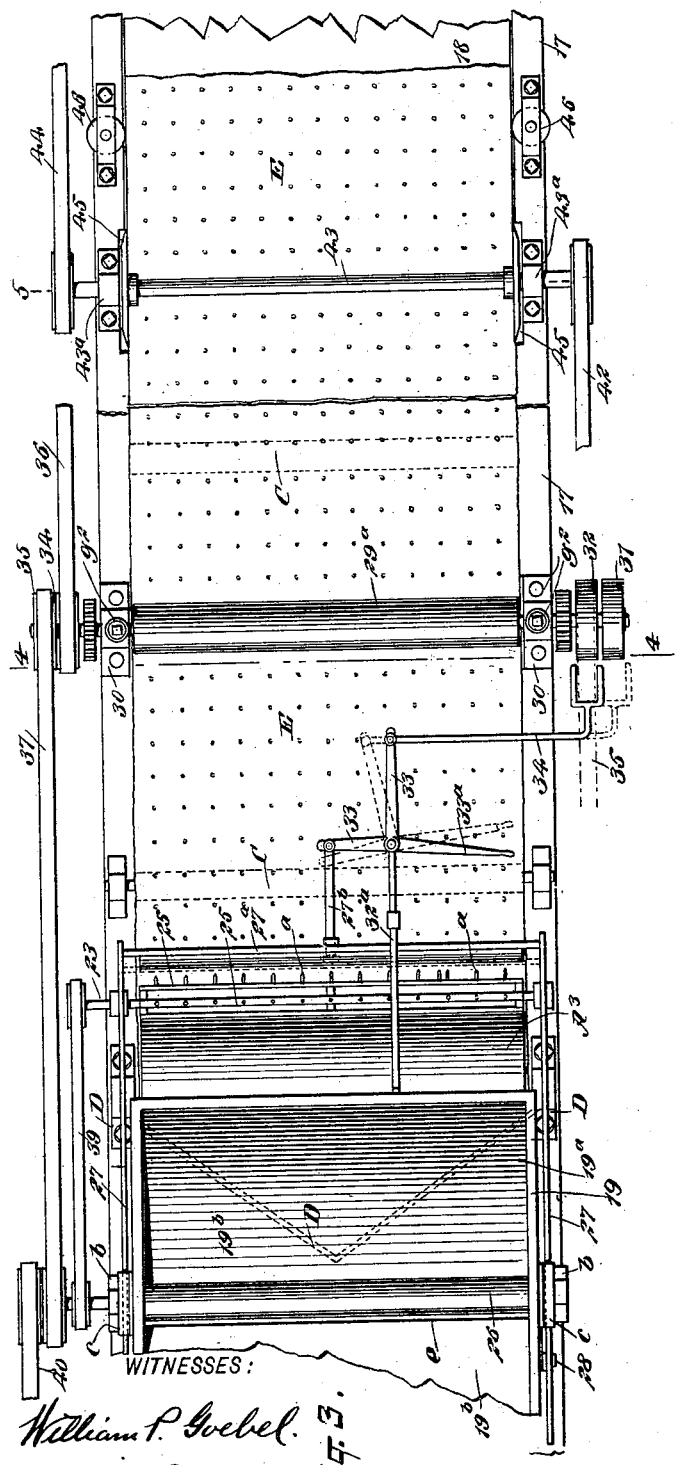
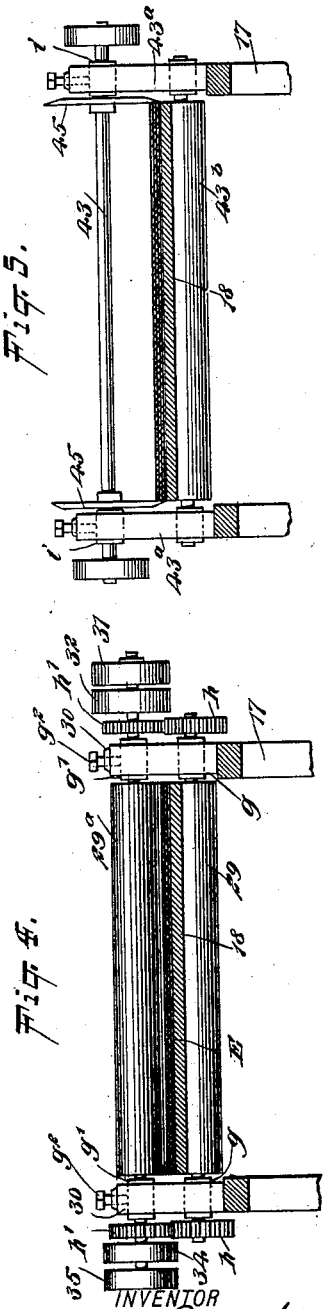
WITNESSES:
William P. Goebel.
Wm. P. Patton.
INVENTOR
Patrick Ryan
BY
ATTORNEYS No. 654,024. Patented July 17, 1900.
P. RYAN.
MACHINE FOR MAKING FIREPROOF COVERINGS FOR WALLS OR CEILINGS.
(Application filed Jan. 29, 1900.)
(No Model.) 5 Sheets—Sheet 4.
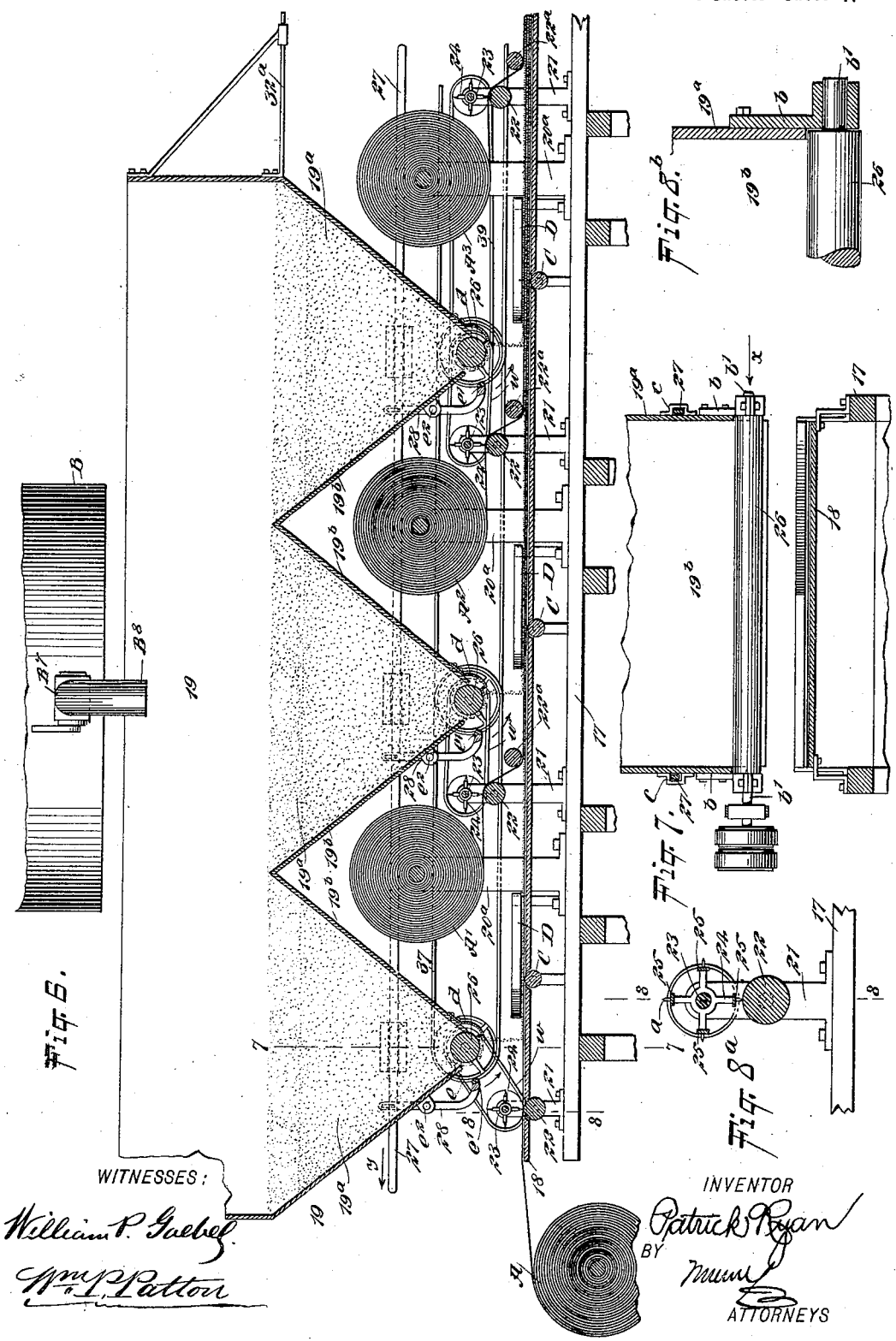

No. 654,024. Patented July 17, 1900.
P. RYAN.
MACHINE FOR MAKING FIREPROOF COVERINGS FOR WALLS OR CEILINGS.
(Application filed Jan. 29, 1900.)
(No Model.) 5 Sheets—Sheet 5.
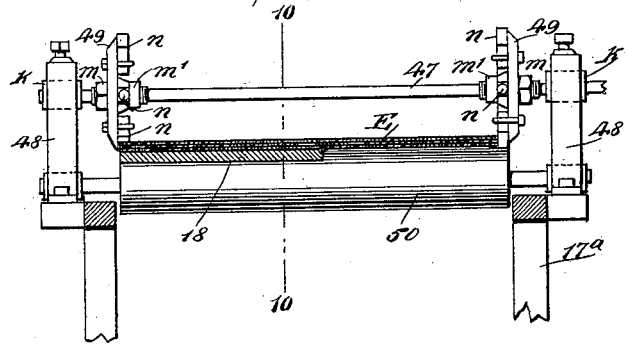
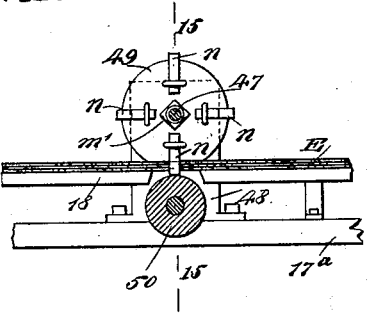
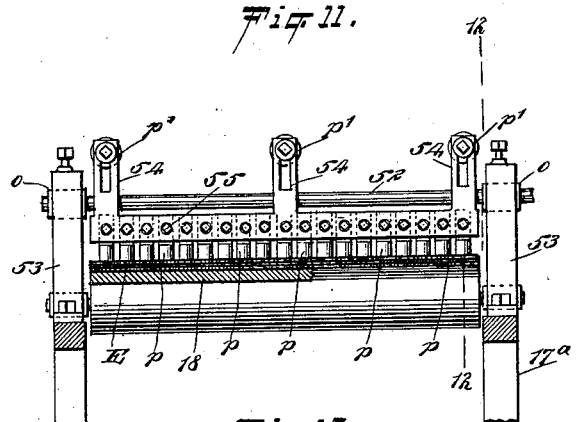
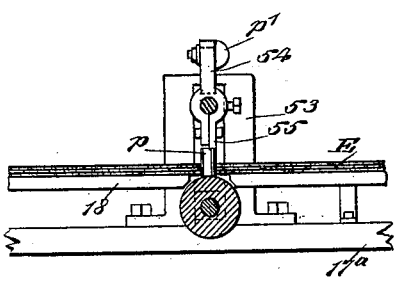
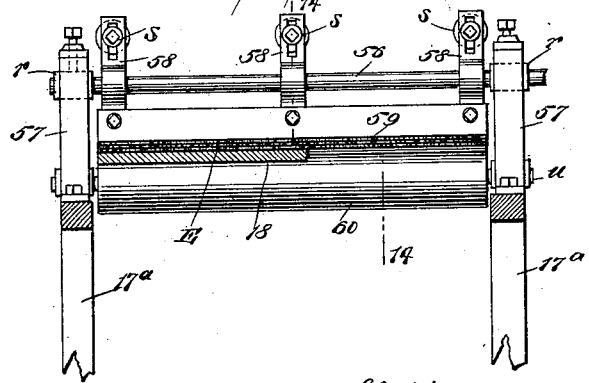
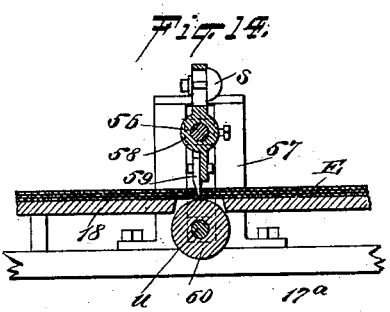
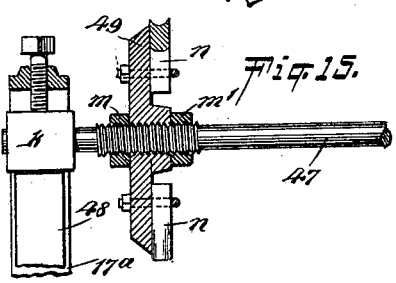
WITNESSES:
William P. Goebel
Wm. P. Patton
INVENTOR
Patrick Ryan
BY
ATTORNEYS
THE NORRIS PETERS CO., PHOTO-LITHO., WASHINGTON, D. C.

UNITED STATES PATENT OFFICE.

PATRICK RYAN, OF NEW YORK, N. Y.

MACHINE FOR MAKING FIREPROOF COVERINGS FOR WALLS OR CEILINGS.

SPECIFICATION forming part of Letters Patent No. 654,024, dated July 17, 1900.

Application filed January 29, 1900. Serial No. 3,216. (No model.)

*To all whom it may concern:*

Be it known that I, PATRICK RYAN, a citizen of the United States, and a resident of the city of New York, borough of Manhattan, in the county and State of New York, have invented a new and Improved Machine for Making Fireproof Coverings for Walls or Ceilings, of which the following is a full, clear, and exact description.

This invention relates to the manufacture of fireproof wall and ceiling coverings, and more particularly to the production in quantity of an improved fireproof plaster-board, which is the subject of an application filed by me on the 3d day of January, 1900, Serial No. 241.

The object of my present invention is to provide novel, simple, and effective means for the rapid and perfect manufacture of the improved wall-coverings of my invention reliably and cheaply, and thus enable their economical substitution for lath and plaster as a wall or ceiling material.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a side elevation of the improved machine represented in two portions which together form the entire device. Fig. 2 is a plan view of the same. Fig. 3 is an enlarged plan view of details, showing partially the means for controlling the discharge of liquid coating material from holders upon sheets moved below the same and other details of construction. Fig. 4 is a transverse sectional view substantially on the line 4 4 in Fig. 3. Fig. 5 is a transverse sectional view essentially on the line 5 5 in Fig. 3. Fig. 6 is an enlarged sectional side elevation of parts substantially on the line 6 6 in Fig. 2. Fig. 7 is a transverse sectional view substantially on the line 7 7 in Fig. 6. Fig. 8 is a transverse sectional view substantially on the line 8 8 in Figs. 6 and 8ª. Fig. 8ª is a transverse sectional view of the details shown in Fig. 8, taken substantially on the line 8ª 8ª in said figure. Fig. 8ᵇ is an enlarged fragmentary and partly-sectional detail view showing an end portion of a feed-roller employed and a detachable hanger-arm therefor, the position of said arm being indicated by the arrow $x$ in Fig. 7. Fig. 9 is an enlarged transverse sectional view substantially on the line 9 9 in Fig. 2. Fig. 10 is a longitudinal sectional view substantially on the line 10 10 in Fig. 9. Fig. 11 is a transverse sectional view substantially on the line 11 11 in Fig. 2. Fig. 12 is a longitudinal sectional view substantially on the line 12 12 in Fig. 11. Fig. 13 is a transverse sectional view essentially on the line 13 13 in Fig. 2. Fig. 14 is a longitudinal sectional view substantially on the line 14 14 in Fig. 13. Fig. 15 is an enlarged transverse sectional view of parts substantially on the line 15 15 in Fig. 10; and Fig. 16 is a perspective view of one of the plaster-boards completed, which is the product of the improved machine.

The invention, briefly described, comprises an elongated supporting-frame having a table on its upper portion, a holder for liquid coating material having compartments, a mixing-tank for the liquid coating material adapted to supply the holder-compartments therewith, and a plurality of paper-sheet carriers arranged in sequence over the table and from which elongated webs of paper or the like may be extended over each other and rest upon the table.

The machine also embodies means to control the escape of the liquid material from the holder-compartments upon the respective paper sheets, means to evenly and thinly distribute the coating material thereon as they are moved on the table, a device for perforating and scalloping each paper sheet, a device to compress all the coated paper sheets together, thus forming a continuous plaster-board, a device for trimming surplus material from the side edges of the plaster-board material, and means to cut the compound web into sheets or completed plaster-boards as it approaches the discharging end of the machine.

The supporting-frame of the machine is lengthy and for convenience in representation is shown in two parts 17 17ª, as appears in Figs. 1 and 2 of the drawings, the end $z$ of the frame portion 17ª joining the end $z'$ of the frame portion 17 when the machine is in completed condition. On the frame 17 17ª, which is of a suitable height and substantially rectangular, a flat table 18 is supported and extends throughout its length. At one end of the frame portion 17 a holder 19 is supported above the table 18 a sufficient distance to permit the location of other details between the lower portion of the holder and the table.

The holder 19 is divided into a plurality of compartments 19ª, each of which has two transverse walls 19$^b$, which converge toward their lower edges, but are separated at said edges, thus affording a transverse opening of suitable width at the bottom of each compartment 19ª, extending across the same. Preferably the transverse inclined walls 19$^b$ extend upwardly but a portion of the entire height of the holder 19, so that liquid material which is introduced into any one of the compartments 19ª if filled into the same above the top edges of the transverse walls 19$^b$ will flow into the other compartments and finally assume the same level in all of said compartments.

At the end of the table 18 which is below the outermost end of the liquid-holder 19 a supported stand 20 is positioned, carrying a transverse roller whereon a long paper-roll A is wrapped, so that one end portion of the paper-roll may be drawn over the adjacent end of the table 18. As shown in Figs. 1, 2, and 6, I have provided three liquid-holding compartments 19ª; but it is be understood that this number may be increased, if desired, and it will be seen that a space is afforded between the inclined side walls of these compartments for accommodation of two paper-rolls A' A², which are respectively supported upon a transverse roller journaled at the ends in stands 20ª, erected upon the sides of the frame portion 17. At the rear end of the liquid-holder 19 another paper-roll A³ is held to rotate by its wrapped engagement with a transverse roller journaled at the ends in opposite stands 20ª.

Upon stands 21, erected upon the sides of the frame portion 17, transverse rollers 22 are journaled, one of said rollers being located near each paper-roll, as clearly shown in Fig. 6, and one end of each paper-roll is passed over a respective supporting-roller when the machine is arranged for service, the respective paper sheets A A' A² A³ then being each drawn under a roller 22ª, supported transversely of and near to the table 18. Upon each pair of stands 21, above the roller 22, a paper-perforating device is held to rotate, said perforating devices being alike and constructed as follows.

A shaft 23 is journaled in bearings formed or secured in each pair of upright stands 21 at a proper distance above the roller 22, and upon shaft 23 a set of spider-frames 24 is mounted and secured, three of said spider-frames being shown on said shaft in Fig. 8, but their number may be increased or diminished, if this is desired. Upon the three spider-frames, which have each four radial arms, four pressure-bars 25 are mounted and secured, each bar being affixed upon one arm of each frame, these arms being located in the same plane to adapt them to receive the straight bar which they support.

On each pressure-bar 25 a series of spaced punches $a$ projects outwardly, and said punches on each bar impinge upon the peripheral surface of the roller 22 to which they are opposite, there being a slight elasticity afforded the face of the roller to prevent injury to the punches. It will be evident that if the paper sheets composing the rolls A, A', A², and A³ be respectively drawn over the rollers 22 while the punching device above each roller is rotating successive rows of perforations will be formed across each paper sheet, as indicated in Fig. 2. The means for the simultaneous rotation of all the punching devices is shown in Figs. 1 and 2 and will be hereinafter described.

Each compartment 19ª of the holder 19 is provided at its lower end with a device for controlling the discharge of the liquid coating material therefrom, and as these devices are of similar construction a description of one will answer for the three, which are respectively positioned at the transverse opening between the lower ends of the inclined walls 19$^b$ of each receptacle or compartment 19ª. As shown in Figs. 3, 7, and 8$^b$, hanger plates or arms $b$ are removably secured at opposite points on the converged lower end of each compartment 19ª, said arms, which are perforated near their lower ends in alinement, affording bearings for the journal ends $b'$ of a feed-roller 26. The feed-roller 26 is of a length to extend from side to side of the compartment 19ª to which it is adjacent and is of such diameter as adapts it to nearly fill the opening between the lower ends of the inclined walls 19$^b$, as shown in Fig. 6.

Two slide-bars 27 are loosely secured along the sides of the liquid-holder 19 by their free engagement with bracket-plates $c$, that project from the holder near its bottom, whereby the bars 27 are disposed oppositely in the same horizontal plane.

Each feed-roller 26 has a loose engagement with the straight lower edge of the rear transverse wall 19$^b$ of a respective compartment 19ª, so that escape of the liquid coating material is prevented at the point where the roller and rear cross-wall have contact. A feed-slit $e$ is provided between the forward transverse wall 19$^b$ and the periphery of the feed-roller 26 for each compartment 19ª, so that a layer of the coating liquid in a compartment will be permitted to adhere to the roller therefor and be carried away from the feed-slit by a rotatable movement of the feed-roller in the direction of the curved arrow shown near each feed-roller in Fig. 6.

On the rear transverse wall 19$^b$ of each compartment 19ª a spring-bodied scraper $d$ is secured at its upper end, said scrapers each having a width sufficient to permit them to respectively engage with a feed-roller 26 throughout the length of the latter. On the free lower portion of each scraper $d$ a bend is formed, so as to project the edge thereof toward and against the periphery of the feed-roller to which it is opposite. It will be seen that each scraper $d$ will when the machine is in operation be adapted to scrape the coating from the periphery of a roller with which it contacts, and such material will drop toward the table 18.

On the forward transverse wall $19^b$ of each compartment $19^a$ two arms 28 are pivoted intermediately of their ends, as shown at $e^2$ in Fig. 6, and the upper extremities of each pair of said arms are loosely connected with the slide-bars 27. The lower ends of each pair of arms 28 are similarly bent toward the slit $e$ in the lower part of the compartment $19^a$ upon which said arms are pivoted, and these bent lower ends are connected by a cross-bar. On the connecting cross-bar of each pair of rockable arms 28 a pliable facing $e'$ is secured, which is preferably formed of vulcanized gum; but other available material may be used.

It will be evident that by a sliding movement given to the slide-bars 27 in a forward direction (indicated by a straight arrow $y$ in Fig. 6) the lower ends of the arms 28 and the cross-bar thereon will be moved toward the slits $e$, and by this means said slits may be partially or entirely closed to control the escape of the liquid coating material from said slits.

At proper intervals antifriction-rollers C are held by their journal ends in suitable boxes on the sides of the frame of the machine, so as to roll freely in transverse slots in the table 18, said rollers projecting slightly above the table for contact with a paper sheet that may be drawn rearwardly upon the table.

At the rear of the liquid-feeding roller 26 for each compartment $19^a$ a preferably V-shaped spreader-plate D is located, having its point or apex of the angle thereon directed forwardly and positioned at the transverse center of the table 18, these three spreader-plates having their rear ends supported upon uprights which are projections from the sides of the frame portion $17^a$, as indicated in Figs. 3 and 6.

At a suitable distance from the holder 19 and rearwardly of the same two feeding-rollers 29 $29^a$ are positioned, one above the other, in suitable bracket frames or housings 30, the lower roller 29 being journaled at its ends in stationary boxes $g$, which engage within the lower portions of the housings, so as to dispose the upper portion of the roller-body in a transverse slot formed in the table 18 and permit the peripheral surface of said upper portion of the feed-roller 29 to project slightly above the top surface of said table. The upper feed-roller $29^a$ is journaled at its ends in the boxes $g'$, that are slidably held in the housings 30, and set-screws $g^2$, which are screwed into the upper ends of the housings, have engagement at their ends with the boxes $g'$ and by their adjustment graduate the pressure of the roller $29^a$ upon paper or the like which is passed between the two feed-rollers 29 $29^a$. The ends of the feed-rollers 29 $29^a$ are extended outside of the housings 30, and on the lower roller 29 a spur-gear $h$ is mounted upon each of its ends.

Two spur-gears $h'$ are secured upon the ends of the upper feed-roller $29^a$ and have meshed engagement with the gears $h$, as shown in Fig. 4. At the right-hand end of the upper roller and outside of the gear $h'$ thereon a pulley 31 is secured, and between said pulley and the spur-gear $h'$ a loose pulley 32 is mounted upon the end of the shaft of the upper roller $29^a$, these pulleys being designed to accommodate a main driving-belt for the machine.

From the rear of the liquid-holder 19 a bracket-arm or equivalent support $32^a$ projects toward the feed-rollers 29 $29^a$, and on said arm a bell-crank lever 33 is pivoted to rock in a horizontal plane. Upon the outer end of the arm of the bell-crank lever 33, which projects longitudinally of the table 18 and toward the feed-rollers 29 $29^a$, one end of a shifting-bar 34 is pivoted, and the latter extends laterally to dispose its forked outer end nearly opposite the fast and loose pulleys 31 32, an endwise movement of the shifting-bar being adapted to transfer the main driving-belt 35 (indicated by dotted lines in Fig. 6) from one pulley to the other. A handle-bar $33^a$ is projected from the bell-crank lever 33 for its manipulation when desired.

A cross-bar $27^a$ is secured by its ends upon the rear ends of the slide-bars 27, and from said cross-bar, intermediate of the slide-bars, an arm $27^b$ projects toward the bell-crank lever 33, so as to permit a pivoted connection of the rear end of the arm $27^b$ with the outer end of the transverse member of the bell-crank lever.

It will be evident from the foregoing description that an adjustment of the shifting-bar 34 so as to place the main belt 35 upon the fast pulley 31 will cause a rotation of the feed-rollers 29 $29^a$ and at the same time open the slits $e$ in the lower portions of the liquid-holding compartments $19^a$ a proper degree to coat the liquid-feed rollers 26.

Upon the left-hand end of the upper paper-roller $29^a$, exterior of the spur-gear $h'$ thereon, two pulleys are affixed for the reception of the respective belts 36 37. As best shown in Fig. 2, the innermost belt 36 is extended rearwardly to engage a pulley $36^a$, which is secured upon one end of the shaft of a top feed-roller 38, held to receive vertical adjustment in two opposite housing-frames $30^a$, which are similar to the housings 30. The housing-frames $30^a$ also hold in position a lower paper-feed roller exactly the duplicate of the lower feed-roller 29, and in a like manner the second pair of paper-feed rollers, of which the roller 38 is the uppermost, is adapted to aid the first-described pair of feed-rollers in giving assured progressive movement to the paper sheets that pass between them from the front end of the table 18 to the rear end of the same.

Each liquid-feed roller 26, at the left-hand end thereof, has its shaft extended beyond the supporting-hanger $b$, and upon each of the extended portions of the shafts of the forward and intermediate feed-rollers 26 two pulleys are mounted. On the extension of the shaft of the liquid-feed roller 26, which is held to rotate below the rearmost liquid-holding compartment $19^a$, three pulleys are mounted and secured, and the belt 37, which is engaged with the pulley 35 on the upper feed-roller $29^a$, extends forwardly and is mounted upon the intermediate pulley of the three pulleys fixed on said feed-roller shaft extension. The innermost pulley on the left-hand shaft extension of the rearmost liquid-feed roller 26 receives one doubled end portion of an endless belt 39, which is extended rearwardly and engages with its rear doubled end a pulley secured on an outer end of the shaft 23 for the paper-perforating device provided to operate upon paper drawn from the rearmost paper-roll $A^3$.

The outermost pulley of the three pulleys secured upon the shaft extension of the rearmost liquid-feed roller 26 carries one doubled end of a belt 40, that extends forwardly and engages the outermost pulley on the left-hand shaft extension of the intermediate liquid-feed roller 26, and upon the innermost pulley on the shaft extension of the intermediate feed-roller 26 a belt 41 extends forwardly to engage the outermost pulley on the forward feed-roller 26, this construction and arrangement of parts relating to the connection of the three liquid-feed rollers 26 with the upper paper-feed roller $29^a$ being indicated in Fig. 2.

On the left-hand end of each of the shafts 23, which are portions of the paper-perforating devices provided for paper sheets carried on the rolls $A'$ $A^2$ $A^3$, a pulley is secured, and a belt $w$ is extended from each of said pulleys to engage a pulley on a respective roller-extension 26, which connection of parts adapts the punching devices carried by said shafts 23 to rotate simultaneously for the perforation of paper sheets when the latter are drawn beneath said punching devices.

On the right-hand end of the shaft of the rearmost top paper-feed roller 28 a pulley $38^a$ is secured exterior of the spur-gear $h'$ thereon, and a belt 42, which has its rear portion mounted upon this pulley, is extended rearwardly to engage a pulley on the right-hand end of a mandrel 43, which is part of a paper-trimming device the construction of which is as follows:

The mandrel 43 is held to rotate transversely on the machine-frame portion 17 by boxes $i$, held adjustably in standards $43^a$, and projects at each side of the frame, the right-hand end having the pulley previously mentioned secured thereon to receive rotary motion from the belt 42, and on the left-hand end of the mandrel another pulley is affixed to accommodate one end portion of a belt 44, that will presently receive further description. On the mandrel 43, adjacent to the boxes $i$, two similar disk cutters 45 are mounted and secured, the cutting peripheral edges of these circular blades being so relatively positioned that they are adapted to shave the opposite side edges of plaster-board material E, which is moved rearwardly upon the table 18. A rotatable roller $43^b$ is located in a slot in the table 18, directly beneath the mandrel 43, the true ends of this roller being adapted to contact with the cutting portions of the disks 45, and thus coact with the latter to render their action efficient.

In sequence with the cutters 45 two or more guide-rollers 46 are held to rotate at each side of the machine-frame portion 17, said rollers at each side of the frame being spaced apart a suitable distance and adapted to engage with their peripheral faces the true edges of the moving material they are to guide truly along the table toward its rear end. Upon the frame portion $17^a$, at a proper distance from the edge-truing device just described, an edge-scalloping device is positioned, comprising a shaft 47, held rotatably on the top of the frame by boxes $k$, so that the shaft is disposed transversely of the table 18 and above it a proper distance, as best shown in Figs. 2, 9, and 10.

The preferred means for rotatably supporting the shaft 47 consists of two similar bracket-stands 48, secured upon the sides of the machine-frame, these stands bearing the boxes $k$, wherein the journals of the shaft are held to rotate. Near each end of the shaft 47 a head-block 49 in circular form is mounted and secured adjustably by jam-nuts $m$ $m'$, that have a threaded engagement with screw-threads cut on the body of the shaft adjacent to its journal ends. A plurality of punches $n$ have their bodies clamped upon the inner side of each circular head-block 49, so as to project their outer ends somewhat beyond the edge of the head-block which carries them. As shown, the punches for each head-block number four; but this number may be increased or diminished, if desired, and preferably the cutting end of each punch $n$ is cupped to give it a bevel edge, as shown in Fig. 15.

The head-blocks 49 and punches $n$ thereon are so relatively disposed that the lower end of each punch will be adapted to track inside of and near the side edges of the table 18, approaching the periphery of a rotatable drum 50, the ends of the shaft of the drum being journaled in the lower portions of the bracket-stands 48. The drum 50 is preferably formed of rawhide and is cylindrical in its body, that is located mainly below the table 18, but projects up into a transverse slot in the table, so that the outer ends of the punches $n$ may successively pass through material imposed upon the table and then slightly contact with the periphery of the drum when the shaft 47 is revolved.

Upon the end of the transverse shaft 47, which extends beyond the left-hand side of the frame portion $17^a$, a pulley is secured to receive the rear doubled end of the belt 44, previously mentioned, which adapts the shaft 47 and punches carried thereon to rotate in unison with the rotatable movement of the cutters 45. Two pulleys are mounted on the shaft 47 at the left-hand end thereof, one of said pulleys being exterior of that whereon the belt 44 is mounted, and the outermost pulley on the shaft 47 is engaged by one end of a belt 51, which is extended toward the rear of the table 18 and is mounted upon a pulley fixed on the left-hand extremity of the transverse spindle 52, that is a portion of a device which punches a transverse row of holes in the plaster-board material, said rows being at such distances apart as will define the length of each plaster-board when it is completed.

The punching device just mentioned and that is represented in Figs. 1, 2, 11, and 12 comprises the spindle 52, held to rotate in two opposite housing-frames 53, erected from the machine-frame portion $17^a$ by vertically-adjustable boxes $o$. There are a plurality of similar arms 54 secured at spaced intervals upon the spindle 52, the lower ends of said arms being connected by a transverse punch-carrying bar 55, and their upper ends being projected above the spindle. A suitable number of punches $p$ have their bodies secured upon the bar 55, so that the working ends of the punches will be alined and arranged adjacent to each other, as is clearly shown in Fig. 11.

Upon the upper ends of the arms 54 an adjustable counterbalance-weight $p'$ is secured, the said weights being designed to facilitate the rotation of the punching device without vibration of the spindle or excessive friction on its journals.

In service, assuming that material to be operated upon by the series of punches $p$ is moved at a speed uniform with the rotation of the spindle 52, it will be seen that at each complete revolution of the spindle a transverse row of holes will be punched in such material, and said rows of holes will be evenly spaced apart, two rows of these perforations defining the length of a plaster-board which is subsequently severed from the other plaster-board material by means that will now be described.

Rearwardly of the punching device having the series of punches $p$ a cutting mechanism is positioned transversely on the machine-frame, consisting of details best shown in Figs. 13 and 14, but also appearing in Figs. 1 and 2. The cutting device comprises a shaft 56, held rotatably near its ends in boxes $r$, vertically adjustable in the housing-frames 57, that are oppositely mounted and secured upon the sides of the frame portion $17^a$. A plurality of arms 58 are secured at spaced distances apart on the shaft 56, three of said arms being shown in Figs. 2 and 13. The arms 58 engage the shaft 56 near the centers of the arms, and on a like end of each arm a counterbalance-weight $s$ is adjustably secured.

Upon the opposite ends of the arms 58 a cutter-knife 59 is bolted, the beveled cutting edge of which is projected beyond the ends of the supporting-arms. A cylindrical drum 60, preferably made of rawhide or similar material, is secured upon a shaft $u$, which at its ends has rotatable engagement with boxes held in the housing-frames 57. The upper surface of the drum 60 projects into a transverse slot formed in the table 18, as clearly shown in Fig. 14, so that it will be nearly alined with the plane of the table-top. The distance from the center of the shaft 56 to the cutting edge of the knife 59 should be equal to the distance between the center of the spindle 52 and outer ends of the punches $p$.

It will be obvious that if the cutting device is stationed a proper distance from the punching device next in front of it and the rotary motion of these two devices is equal in speed the flat material E, moved upon the table 18 rearwardly and first subjected to the action of the transverse row of punches $p$, will be cut across the row of punched holes at their centers, thus severing a plaster-board and forming scallops along each severed transverse edge of the material.

At a proper distance above or at one side of the liquid-holder 19 there is supported an upright mixing-tank B, having a capacity sufficient for a charge of the liquid coating for each of the compartments $19^a$. The mixing-tank B is preferably cylindrical and, as shown in Fig. 1, is provided with two spaced upright rotatable shafts $B'$, each provided with a bevel-pinion $B^2$ on its upper end, which projects above the tank, these pinions having meshed engagement with like bevel-pinions secured on a horizontal shaft $B^3$, rotatably supported by brackets $B^4$ above the top of the tank, a pulley $B^5$ being secured on one end of the shaft $B^3$ to receive a belt (not shown) for the transmission of motion and power to the shafts $B'$.

A suitable number of stirring rods or blades $B^6$ project from each shaft $B'$, and the blades on one shaft pass between the blades on the other shaft, which adapts said blades to thoroughly stir material that is placed in the tank B. A valve $B^7$ controls the escape of liquid material from a spout $B^8$, projecting from the side of the tank B at its bottom, the spout preferably being extended over the intermediate compartment $19^a$ of the liquid-holder 19. A suitable fireproof liquid mixture of ingredients is prepared in the tank B when the improved machine is to be put into service, and the holder 19 may be filled to a height to permit the liquid coating material to flow over the inclined partition-walls 19$^b$ into each compartment, as indicated in Fig. 6.

The paper sheet on the roll A is first extended over the roller 22 and below the perforating device rotatably mounted above said roller, said paper sheet that is imposed upon the table 18 being drawn rearwardly by hand to pass it between the paper-feed rollers 29 29$^a$. An end of the paper sheet forming the paper-roll A' is next drawn therefrom over the adjacent roller 22 and thence down below the idler-roller 22$^a$ near to and rearward of the roller 22, and from the roller 22$^a$ the paper sheet is manually drawn between the paper-feed rollers 29 29$^a$. An end of the paper-roll A$^2$ is next drawn between the perforating device and roller 22 adjacent to the next lower idler-roller 22$^a$, beneath which this paper sheet is extended to rest upon the preceding paper sheet A' and pass between the paper-feeding rollers 29 29$^a$. A paper sheet from the roll A$^3$ is now drawn over the adjacent roller 22, thence down beneath the rearward idler-roller 22$^a$, and from it between the paper-feeding rollers 29 29$^a$, and after the four paper sheets have been entered between said rollers the upper roller 29$^a$ is lowered, so as to press the paper sheets sufficiently for the assured movement of all these end portions from the paper-rolls A A' A$^2$ A$^3$ rearwardly and at the same rate of speed. The shifting-bar 34 is now adjusted to throw the main belt 35 from the loose pulley 32 upon the secured pulley 31, which will start all working parts of the machine into motion and simultaneously open the feed-slits $e$ at the bottoms of the liquid-holding compartments 19$^a$ for a proper discharge of the liquid-plaster coating. It will be seen that the scrapers $d$, respectively engaging a feed-roller 26, will remove the plaster coating therefrom, so that said material will drop from each liquid-feeding roller 26 upon an appropriate paper sheet A A' A$^2$. The progressive movement of the paper sheets A', A$^2$, and A$^3$ will pass the three coated sheets A A' A$^2$ beneath the plates D, so that the latter, which are each supported a proper distance above the paper sheet, will evenly distribute the plaster coating thereon and push any surplus material off of the paper sheet at its side edges. The uppermost paper sheet that is drawn from the rearmost paper-roll A$^3$ forms a covering for the coated sheet A$^2$, and at the time the coated sheets reach the paper-feeding rollers 29 29$^a$ the upper roller 29$^a$ should be adjusted to compensate for the coatings on the sheets, and thus permit a proper amount or thickness of the coating to remain on and between adjacent paper sheets. The feeding-rollers 29 29$^a$ are aided in their operation by the other pair of feeding-rollers, of which the roller 38 is the uppermost, and from the rearmost pair of feeding-rollers the consolidated plaster-board material E is moved toward and is engaged at each side edge by the edge-trimming circular cutters 45. The true edges of the plaster-board material as it moves rearwardly upon the table 18 have contact with the guide-rollers 46, which serve to keep the plaster-board material or composite sheet moving straight upon the table 18. The plaster-board material next is moved below the punches $n$, which are so relatively positioned above each side edge of said material as to adapt these duplicate sets of punches to cut scallops at short intervals of separation along each trued edge of the plaster-board material. The progressive movement of the plaster-board material upon the table 18 next brings the side edge-scalloped portion thereof beneath the row of transversely-disposed punches $p$, that are forced down through the plaster-board at each complete revolution of said punches along with the spindle 52, which carries them, and, as before mentioned, the radial distance from the center of the spindle to the outer ends of the punches, or either one of said punches, defines the length of each plaster-board. The plaster-board material, which has been transversely punched to form close rows of holes therein at some distance apart or between said rows, is next brought beneath the cutter-blade or knife 59, and the rate of progressive movement of the plaster-board material being uniform with the rate of rotation given to the shaft 56, that carries said knife, it will be obvious that the edge of the knife 59 may be timed in movement to engage with the plaster-board material at the centers of the holes punched by the punches $p$, and thus cut a rectangular plaster-board E, such as appears in Figs. 2 and 16, from the main portion of the plaster-board material while the latter is being continuously formed.

Having thus described my invention, I claim as new and desire to secure by Letters Patent—

1. A machine for making plaster-boards, comprising means to feed paper sheets on a level support, a sheet-perforating device, a device to coat a plurality of said paper sheets with a fireproof mixture, a compressing device, an edge-trimming device, and means to cut a plaster-board from an end portion of the completed plaster-board material.

2. A machine for making plaster-boards, comprising a suitable support, a means to feed a plurality of paper sheets thereon, a perforating device for each paper sheet, a device adapted to evenly coat a plurality of the paper sheets with a fireproof mixture, a compressing device adapted to consolidate the plaster-board material after it is coated, an edge-trimming device, an edge-scalloping device, and a device adapted to cut a completed plaster-board from the main portion of such plaster-board material.

3. A machine for making fireproof plaster-boards, comprising a frame, a table thereon, a plurality of holder-compartments for liquid coating, held above the table near one end thereof, means to control the discharge of liquid coating material from each compartment upon a paper sheet drawn below it, a device to evenly spread the coating on each sheet, a paper-feeding device adapted to compress the coated paper sheets together, an edge-trimming device, an edge-scalloping device, and means to cut a completed plaster-board from the main portion of such plaster-board material, these several devices being arranged on the frame to operate successively.

4. A machine for making fireproof plaster-boards, comprising a frame, a table thereon, a plurality of holder-compartments for coating material held above the table near one end thereof, means to control the discharge of coating from each compartment, means to support a plurality of paper sheets on the frame for their extension over each other on the table, a perforator device for each paper sheet, a device to evenly spread the coating material upon the paper sheets, a paper-compressing device that is also a paper-feeder, an edge-trimming device, an edge-scalloping device, a transverse perforator adapted to form rows of holes defining the length of a plaster-board, and a cutting device following the transverse perforator and cutting through the centers of the row of holes formed by the perforator.

In testimony whereof I have signed my name to this specification in the presence of two subscribing witnesses.

PATRICK RYAN.

Witnesses:
WM. P. PATTON,
JNO. M. RITTER.